United States Patent [19]
Santurri et al.

[11] 3,949,133
[45] Apr. 6, 1976

[54] HIGH PRESSURE ASSEMBLY AND LAMINATE

[75] Inventors: Pasco R. Santurri, Ballwin; Howard W. Mumm, St. Louis; Robert L. Flowers, Ellisville; Robert A. Eaton, St. Peters, all of Mo.

[73] Assignee: The Orchard Corporation of America, St. Louis, Mo.

[22] Filed: Jan. 28, 1974

[21] Appl. No.: 437,197

[52] U.S. Cl. ................ 428/211; 428/530; 428/531; 428/213; 428/218; 427/326
[51] Int. Cl.[2] ........................ B32B 7/02; B32B 27/08
[58] Field of Search ........... 161/263, 258, 413, 264; 428/530, 525, 531, 145, 213, 218, 211

[56] References Cited

UNITED STATES PATENTS

| | | | |
|---|---|---|---|
| 3,067,077 | 12/1962 | Latella et al. | 161/263 X |
| 3,131,116 | 4/1964 | Pounds | 161/258 |
| 3,537,950 | 11/1970 | Hale | 161/258 |
| 3,816,232 | 6/1974 | Meiser | 161/263 X |

OTHER PUBLICATIONS

Noble, *Plastics*, Dec. 1946, "Laminating With Melamine Resins, " pp. 46, 48, 49, 94, 95.

*Primary Examiner*—George F. Lesmes
*Assistant Examiner*—Patricia C. Ives
*Attorney, Agent, or Firm*—Ralph W. Kalish

[57] ABSTRACT

A high pressure laminate comprising an overlay sheet impregnated with a melamine resin, and an unimpregnated decorative sheet of fibrous cellulosic material, a thin resin coating on preferably the backside of said decorative layer, and a core comprising a multiplicity of sheets of cellulosic material impregnated with a phenolic resin.

18 Claims, No Drawings

HIGH PRESSURE ASSEMBLY AND LAMINATE

BACKGROUND AND SUMMARY OF THE INVENTION

This invention relates to high pressure laminates and, more particularly, to a laminate wherein the decorative layer is of unimpregnated cellulosic fibrous material having a coating on one surface thereof.

It is an object of the present invention to provide a high pressure laminate incorporating a paper for use as a decorative or print layer which does not require prior resin impregnation for integration to the laminate structure, but which is adapted for excellent adhesion to the laminate components.

It is another object of the present invention to provide a high pressure laminate incorporating a paper for use as a decorative or print layer having a low apparent density and a low basis weight, with relatively high porosity, while being recognizably thin, flexible, and easy to handle.

It is a further object of the present invention to provide a high pressure laminate embodying a paper for use as a decorative or print layer which is provided with a thin resin coating on one surface thereof which is conducive to desired bonding between the core stack and the decorative paper while not preventing penetration of the core resin and the overlay resin during the laminating procedure.

It is another object of the present invention to provide a high pressure laminate having a decorative or print layer constituted of essentially a bleached kraft paper having a fiber formation conducive to increased layer strength and reliable integration with the overlay and core; said paper having a resin coating on at least one surface thereof for potentiating the strength of the bond to the laminate components.

It is a still further object of the present invention to provide a high pressure laminate having optimum strength throughout being resistant to delamination, chipping, cracking, age deterioration, and the like; which is useful for general purposes and is readily post-formable; and which meets industry standards for conventional or decorative laminates.

It is a still further object of the present invention to provide a paper for use as a decorative or print layer in a high pressure laminate which is markedly cheaper than alpha cellulose paper being relatively thin with relatively high porosity and amenable to application of a thin resin coating on one surface thereof through utilization of conventional equipment.

DESCRIPTION OF THE PREFERRED EMBODIMENT

The present invention although relating broadly to high pressure laminates is fundamentally concerned with fibrous sheet material to be used as a decorative layer in such high pressure laminates together with the conventional components thereof, such as, namely, melamine resin impregnated alpha cellulose paper or others as an overlay and a core or substrate comprised of a multiplicity of sheets of kraft paper impregnated with a phenolic resin; with there being a thin resin coating applied to at least one surface of such decorative layer.

It has been discovered that to provide a paper suitable for the decorative layer of a laminate, having requisite porosity for bleeding therethrough of the resins of the core and the overlay during fusing but without necessitating prior impregnation of said layer; having the capability of providing printability to yield enhanced aesthetic appearance; or being relatively thin, and yet possessing the strength together with desired flexibility for assuring structural integrity and functional properties of the resultant laminate; such paper must comprehend a multiplicity of interdependent physical properties. It is the combination of such properties which is critical since a mere random inclusion of less than all of the same would not provide a paper appropriate for high pressure laminate usage.

The particular paper herein having a low basis weight will not require impregnation and is but a fraction of the weight of the conventional impregnated papers which have an average basis weight of about 65 pounds and requiring a like weight of impregnated resin. The thickness of the decorative paper of this invention is within the range of 1 to 3 mils.

Among the essential characteristics of such paper is a porosity (Gurley scale) of 1 to 15 seconds per 100 ml., which indicates a relative high porosity and, particularly, in comparison with the porosity of the commonly used papers which are relatively thick; the same having a Gurley scale reading of 16 to 22 seconds per 100 ml. As indicated above, the combination or properties of the present paper synergistically combine to obviate the necessity of impregnation as with currently utilized papers. For optimum laminate strength the decorative layer must absorb the resins from the overlay and the core to form durable adhesive bonds therewith. Cellulosic material of low porosity would not tend to reinforce the laminate as the same would have less internal strength than the remainder of the laminate layers.

Another critical property of the present paper is a low apparent density, being in the range of 0.5 to 1.0 grams per cubic centimeter. This property is a measure of the bulk of the paper and a low apparent density permits a penetration of the resin melt during the laminate forming operation thereby providing increased strength, whereas paper with a relatively high apparent density does not accept resin as readily to provide the desired laminate strength.

An additional requisite property is the peculiar bursting strength which relates to the tenacity of the fibers of the material when subjected to stretching forces applied perpendicular to the paper surface. The stronger the paper the stronger the finished laminate, since the same acts as a reinforcing member embedded within the melamine resin phenolic resin interface. The bursting strength of the paper of this invention is greater than that of conventional papers, being in the order of 0.6 to 1.5 points per pound as compared with 0.4 points per pound for currently used papers. The expression "points per pound" is simply a convenient unit which is actually determined from a consideration of pounds per square inch per unit of weight.

The basis weight of the present paper is within the range of 10 to 25 pounds per 3,000 square feet which is considerably less than the usual 65 pounds for the same area of conventional papers.

The printability of the paper of this invention is of a quality not approached by conventional papers and permits of a print clarity, specificity of detail, and general high fidelity of reproduction which has not been achieved heretofore. Such printing characteristics is a resultant from the characteristics which are unique and peculiar to the present paper. It is to be recognized that the paper of the present invention is of lighter weight, but greater strength per unit weight, than current papers and although being thin and flexible does not require the application of a stiffening agent such as a resin for permitting of the printing step, as conventional printing techniques may be used with the present paper without prior treatment.

Also of extreme importance is the fiber formation of the paper as such coordinates with the other characteristics to promote laminating property as well as the print quality of such material. The relatively uniform distribution of fibers throughout the paper give the desired strength in the entire paper surface, with there being a relative freedom from voids. Paper with a fiber formation within the ranges hereinbelow set forth can be calendered to a finer finish, being more receptive of ink, than papers heretofore used in high pressure laminates. The requisite fiber ratios are as follows:

| | |
|---|---|
| Soft Wood | 15 – 80% |
| Hard Wood | 20 – 85% |

Typical appropriate soft wood pulps are Douglas Fir, True Fir, Spruce, Jack Pine, Lodgepole Pine, Ponderosa Pine, and Redwood; while suitable hard wood pulps include Ash, Basswood, Beech, Birch, Gum Maple, Oak, Yellow Poplar, and Populus Sp. Such fibers have moderate to large amounts of cutting and fibrillation as it has been found that the cutting of fibers results in a tighter formation of the paper. By fibrillation the fibers are beaten to rupture the thin walls thereof, thereby fraying the thread-like elements exposed, or other words, producing fibrils. These latter are of smaller diameter than the untreated fiber and are thus more flexible and capable of matting together. Such permits of the establishment of an increased number of points of contact between fiber and fiber, conducing to greater strength and lessening the chance of void developed. Bleached kraft paper is an example of a paper having the requisite proportionality of soft wood fibers to hard wood fibers as above set forth.

In view of the above, it is to be observed that the paper of the present invention contains critical properties with respect to apparent density, bursting strength, porosity, basis weight, smoothness, and fiber formation all of which, in combination, synergistically, endow the resultant laminate with printing, rewinding, sheeting, and laying-up attributes not heretofore obtainable with the usual impregnated alpha cellulose paper of the decorative layer. The economies effected by the use of the paper is patent.

In recapitulation the critical properties of the paper constituting the decorative layer are:

| | |
|---|---|
| APPARENT DENSITY | .5 to 1.0 grams per cubic cm. |
| POROSITY (Gurley Scale) | 1 to 15 seconds per 100 ml. |
| BURSTING STRENGTH | .6 to 1.5 points per pound |
| BASIS WEIGHT | 10 to 25 lbs. per 3000 sq. ft. |
| SMOOTHNESS | Maximum 150 Sheffield |
| FIBER RATIO | Soft Wood 15 to 80%<br>Hard Wood 20 to 85% |
| CALIPER (Thickness) | 1.0 to 3.0 mils. |
| TEARING STRENGTH (Cross Direction) | 15 grams minimum |
| TENSILE STRENGTH | 2 lbs. per in. minimum |

The paper of the present invention is coated on preferably one surface with a thin layer of certain resins for enhancing the adhesion of the paper to the core and thus the integration of the same within the laminate for effecting an interply bond strength.

The resins suitable for such coating contain good adhesive qualities with respect to the cellulosic fibers of the material as well as a compatibility with the malamine type resin of the overlay and the phenolic resins of the core or substrate. The resins utilized conceivably chemically interact with the said impregnating resins to bring about a strong chemical adhesion, as well as through physical adhesive forces. Resins of this type may be applied to either the printed side of the paper (top coating) or the unprinted or backside thereof (back coating) or both. It should be understood that such resins are not impregnated within the decorative sheet, nor are the same designed to stiffen the paper, but merely provide a very limited, thin surface coating. These resins desirably exhibit a medium to high polarity, since cellulose and the resins used to impregnate the core stock and overlay are highly polar.

Among resins found to have the properties desired for coating the paper, as above stated, are:

a. epoxy resins having an epoxide equivalent weight of between approximately 400–6000 and having a softening point within the range of 140°–175°F;

b. phenol-furfural resins having a specific gravity of 1.00 – 1.30 and with a softening point within the range of approximately 140°–175°F;

c. resorcinol formaldehyde resins having a specific gravity of 1.00 – 1.30 and a softening point within the range of approximately 140°–175°F;

d. phenol-formaldehyde resins having a specific gravity of 1.15 –1.30 and a softening point within the range of approximately 170°–220°F; and e. polyvinyl butyral resins having a molecular weight between 34,000 and 270,000; a softening point within the range of approximately 105°–155°F; and a specific gravity of approximately 1.00 – 1.25.

In accordance with the conventional practice, coating solutions of the aforesaid resins include the expected curing agent and a solvent. Of these solutions, the curing agents constitute approximately 0.75–20% of solids, including paratoluene sulfonic acid, phosphoric acid, tris (dimethylamino ethyl) phenol, methyl benzyldimethyl amine, amides, such as acetamide, urea, dicyandiamide, sulfones, acid anhydrides, polyamides, and polyamido amines. Suitable solvents include isopropyl alcohol and methyl ethyl ketone. Although the above discussed resins have been found particularly suited for the purposes of the present invention, other resins which may be effectively utilized include acrylonitriles, polyvinyl acetals, polyvinyl chlorideacetates, polyesters, and urea formaldehyde.

The resin coating so applied serves as a reinforcing agent to bond cellulosic fibers thereby increasing the internal strength of the paper as well as promoting adhesion between the various plies adjacent to the decorative layer, thus providing improved physical strength and durability.

These resins are applied in practice, preferably to the unprinted side of the decorative sheet, that is, as a back coating; and such application may be made by conventional equipment familiar to the printing industry, such as, rotogravure, flexographic reverse roll coating, curtain coasters and wire wound metering rods. The most satisfactory method is the utilization of rotogravure as the amount of resin solution applied is critical both to the performance and use of the decorative paper. The amount applied must be sufficient to obtain desired bonding of the paper fibers and the bridging between the core stack and the decorative paper in subsequent laminating. Excess solution may have a detrimental effect as such could transparentize the decorative layer and thereby mar the design for the aesthetic quality thereof. Furthermore, too much of the resin solution would hinder or obstruct the penetration of the decorative layer of paper by the phenolic resin of the core during lamination.

It has been found that the optimum amount of resin solution to be applied to the decorative layer ranges between 0.5 lbs. and 4.0 lbs. per 3,000 sq. ft., dry weight after solvent evaporation. The amount of coating will depend, understandably, upon the particular resin selected. Such resins are of the thermosetting type and have an ability to effect an internal cross-linkage due to many potential active sites.

The following are examples of such resin solutions which have been found useful for the purpose of this invention; the same being set forth merely for exemplary purposes. It should be remembered that said solutions comprise a resin, a curing agent, and a compatible solvent.

| | | |
|---|---|---|
| **EXAMPLE I** | | |
| Polyvinyl butyral | 99 | parts by weight |
| Phosphoric acid | 1 | |
| Methyl ethyl ketone | 400–1000 | |
| **EXAMPLE II** | | |
| Epoxy resin (epoxide equivalent weight 1600) | 80 | parts by weight |
| Polyamide | 20 | |
| Isopropyl alcohol | 150 | |
| **EXAMPLE III** | | |
| Epoxy resin (epoxide equivalent weight 4000) | 80 | parts by weight |
| Polyamido amine | 20 | |
| Methyl ethyl ketone | 100 | |
| **EXAMPLE IV** | | |
| Phenol-formaldehyde | 60 | parts by weight |
| Paratolulene sulfonic acid | 0.6 | |
| Methyl ethyl ketone | 40 | |
| **EXAMPLE V** | | |
| Phenol-formaldehyde | 60 | parts by weight |
| Tris (dimethylamino-ethyls phenol) | 0.6 | |
| Methyl ethyl ketone | 40 | |
| **EXAMPLE VI** | | |
| Resorcinol formaldehyde | 30 | parts by weight |
| Polymeric amido-amine | 6 | |
| Methyl ethyl ketone | 64 | |
| **EXAMPLE VII** | | |
| Phenol furfural | 60 | parts by weight |
| Phosphoric acid | 0.6 | |
| Methyl ethyl ketone | 40 | |

From a study of the examples, it will be seen that there are three broad types of resins which may be utilized for forming the adhesive coating, namely the epoxies, phenolics, and butyrals. In accordance with present knowledge, the proportionality of the resin to the curing agent will vary depending upon the particular resin. It is, of course, obvious that the quantity of solvent is determined by wellknown techniques being adequate merely for applying the solution to the decorative sheet as such solvents are evaporated quite rapidly. When the adhesive-coated decorative sheet is presented for lamination, the solvent will have, understandably, fully evaporated.

The resins of the adhesive coating herein provided are all of thermosetting character and are cross-linkable, which characteristics are critical. Also as brought out above, the coatings must be within the dry weight range above set forth.

In actual utilization of the paper of the present invention, that is, in the formation of high pressure laminates, the procedure generally corresponds to that which has been basic in industry for many years wherein the decorative or print layer is superimposed upon a conventional, phenolic resin-impregnated core, and with a melamine type resin-impregnated overlay disposed protectingly thereupon; the formed stack being then loaded between the polished metal plate of a hydraulic press which is then closed and the work is subjected to a sufficient pressure and heat for an adequate period of time for fusing the stack into a single sheet. The pressure may be in the order of 1000 pounds per square inch with a temperature of approximately 300°F and a period of 20 to 30 minutes being adequate.

The use of the novel decorative layer of the present invention does not alter the appearance of the laminate when compared to conventional laminates having the expected melamine resin-impregnated decorative or print layer, although the same may be slightly thinner than the current laminate by reason of the relative thinness of the decorative paper. However, the overall thickness of the laminate may be easily adjusted by insertion of one or more additional core sheets. Laminates formed in accordance with the present invention have been subjected to industry accepted tests for establishing standards for decorative laminates. Such tests are extensive, comprehending a multiplicity of examinations which have been developed by the National Electrical Manufacturers Association, the same being referred to as the NEMA standards. Among others, such tests comprehend resistance of the surface to wear, boiling water, high temperature, cigarette burns, stains, impact, and the like as well as considering color fastness of the surface, immersion of the laminate in boiling water, flexural strength, etc., etc., all of which are quite well-known in this particular field.

Laminates incorporating the thin resin-coated paper of the present invention have the same wide applicability as do currently available laminates being useful for the expected general purposes for horizontal decoration, as well as vertical surfaces such as walls and the like, and being post-formable into a multiplicity of non-planar shapes. Such laminates have met the test method standards of general in this particular field of endeavor.

In view of the foregoing, it is to be recognized that the cellulosic fibrous material or paper constituting the decorative layer of the present invention with its applied thin coating of resin, as above described, permits of most substantial economy in high pressure laminate manufacture as such as it costs about one-eighth to one-twelfth of that of the currently used papers, such as alpha cellulose paper, taking into account the lack of necessity of effecting impregnation by melamine resins with the attendant obviation of equipment investment as well as requisite plant space. The application of the resin coating is most economically effected as by conventional equipment so that such does not add appreciably to the cost. The coating can be applied simultaneously with the printing or may be applied a day or so consequent. The coating is dried to a non-tacky condition so that the coated decorative paper may then be rolled up for storage without danger of any adhesion.

The paper of the present invention contains sufficient internal bond strength, that is, an inherent bonding of the papers to each other, so that resin impregnation, as with presently used papers, such as alpha cellulose paper, is not required. The resin applied to the paper of this invention is a very thin coating and does not in any way penetrate the paper and hence, does not serve to mechanically strengthen the paper as is developed by resin impregnation by the melamine formaldehyde resins. Thus the novel characteristics of the paper of this invention together with the thin resin coating brings about enhanced properties of laminates developed therewith, as well as providing most substantial economies in materials and production. The omission of resin impregnation in decorative sheets constitutes an advance in the art.

Additionally, with currently used impregnated papers, there is the need to effect disc-curing tests in order to determine, in advance, how each impregnated paper, such as alpha cellulose, will react when placed in a press for laminate formation. Since there is certain to be a batch-to-batch variation which results from differences in the amounts of impregnating material utilized, the characteristics of such impregnating resins, and with further variations resulting from time, pressure, and temperature considerations in the laminating process. Thus, with impregnated papers there is certain to be a lack of consistency so that appropriate measure must be undertaken to counter the variation that will occur from run to run. With the present invention, consistency is at all times assured since the necessity of impregnation with all of its potential for variations is obviated.

Thus, in addition to all of the other attributes above discussed, the attribute of stability and consistency is provided by the present invention.

Furthermore, and of considerable importance, is the fact that by eliminating the impregnating of the decorative sheet the resultant laminate does not possess the "aggressiveness" that is encountered with laminates incorporating an impregnated decorative sheet. With alpha cellulose papers having a 65 pound dry basis weight there is required 65 pounds of dry melamine formaldehyde resin for necessary strength, which impregnation brings about a bulky and heavily loaded paper promoting a resultant laminate which is "aggressive" in that it resists working or fabrication as through the use of tools, such as saws, routers, and the like, as the same are damaged by such laminates. By omitting the impregnation of the decorative sheet in accordance with the present invention, there is avoided the aggressiveness met by current laminates so that operation thereon by tools does not cause tool damage and permits of appropriate facility of working.

The resultant laminates meet the same standards as decorative laminates manufactured according to conventional techniques. Thus, the economy achieved by use of the paper of the present invention does not cause any sacrifice in the quality of the laminates but rather brings about greatly improved properties.

As indicated above, a very important attribute of laminates incorporating a decorative sheet having the thin surface coating of the present invention is the adaptability of the same for facile post-formability. It would appear that the coating enhances the flexibility of the decorative sheet so that cracking thereof is inhibited when the laminator bends or otherwise forms the first laminate under heat and pressure. Concurrently with imparting such flexibility, the resin coating does in some way conduce to a desired fiber integration so that with any severing or cutting a clear edge, devoid of any fiber tears, is produced. Consequently, the resins utilized uniquely impart properties to the paper so that the same is not too rigid nor too soft.

Having described our invention, what we claim and desire to obtain by Letters Patent is:

1. A laminating assembly adapted on the application of high pressure to form a laminate consisting essentially of

- an unprinted overlay sheet of cellulosic material impregnated with a resin selected from the group consisting of melamine formaldehyde resins and modified melamine formaldehyde resins,
- an unimpregnated decorative sheet of cellulosic material having an apparent density of 0.5 to 1.0 grams per cubic cm., a basis weight of 10 to 25 lbs. per 3000 sq. ft., and a porosity (Gurley Scale) of 1 to 15 seconds per 100 ml.,
- an adhesive nonpenetrating surface coating provided on at least one face of said decorative sheet, said adhesive coating consisting essentially of a thermosetting resin from the class consisting of phenol-formaldehyde, phenol-furfural, epoxies, resorcinol-formaldehyde, and polyvinyl butyral, the resins of said class being cross-linkable and being applied in such amount as to provide between 0.5 and 4.0 lbs. per 3000 sq. ft. dry weight, and
- a core comprising a multiplicity of sheets of cellulosic material impregnated with a phenolic resin, said decorative sheet being disposed so that one face is presented immediately upon said core and the other face is in direct contact with the confronting surface of said overlay.

2. A laminating assembly as defined in claim 1 wherein said adhesive coating being applied on the core confronting face of said decorative sheet.

3. A laminating assembly as defined in claim 1 wherein said resin being an epoxy resin having an equivalent weight between approximately 400 and 6,000, and a softening point of within the range of approximately 140°–175°F.

4. A laminating assembly as defined in claim 1 wherein said thermosetting resin being polyvinyl-butyral, having a molecular weight within the range of approximately 34,000 – 270,000; a softening point within the range of approximately 105° – 155°F; and a specific gravity within the range of approximately 1.00 – 1.25.

5. A laminating assembly as defined in claim 1 wherein said thermosetting resin being phenol-formaldehyde, having a softening point within the range of approximately 170°–220°F. and a specific gravity within the range of approximately 1.15 – 1.30.

6. A laminating assembly as defined in claim 1 wherein said thermosetting resin being phenol-furfural, having a softening point within the range of approximately 140° – 175°F. and a specific gravity within the range of approximately 1.00 – 1.30.

7. A laminating assembly as defined in claim 1 wherein said thermosetting resin being resorcinol formaldehyde, having a softening point within the range of approximately 140°–175°F and a specific gravity within the range of approximately 1.00 – 1.30.

8. A high pressure laminate consisting essentially of an unprinted overlay sheet of cellulosic material, a normally unimpregnated decorative sheet having a printed side and a back side, and being of fibrous cellulosic material having an apparent density of 0.5 to 1.0 grams per cubic cm., a basis weight of 10 to 25 lbs. per 3,000 sq. ft., and a porosity (Gurley Scale) of 1 to 15 seconds per 100 ml., and a core comprised of a multiplicity of superimposed sheets of cellulosic material, the cellulosic material of said overlay sheet and of said core sheets being relatively thicker than that of the decorative sheet, said decorative sheet being presented with its printed side immediately underlying the confronting face of said overlay sheet, an adhesive non-penetrating surface coating provided on at least one face of said decorative sheet, said adhesive coating consisting essentially of a thermosetting resin from the class consisting of phenol-formaldehyde, phenol-furfural, epoxies, resorcinol-formaldehyde, and polyvinyl butyral, a first fusible resin selected from the class consisting of melamine formaldehyde resins and modified melamine formaldehyde resins securing said decorative sheet to said overlay sheet, a second fusible resin from the class consisting of phenolic resins securing said decorative sheet upon its opposite face to said core.

9. A high pressure laminate as defined in claim 8 wherein said overlay sheet is normally impregnated with said first fusible resin, and said core sheets are normally impregnated with said second fusible resin.

10. A high pressure laminate as defined in claim 8 wherein said adhesive coating is applied in such manner as to provide between 0.5 and 4.0 pounds per 3,000 square feet dry weight.

11. A high pressure laminate as defined in claim 8 wherein said overlay is of alpha cellulose paper.

12. A high pressure laminate as defined in claim 8 wherein said adhesive coating is applied on the core-confronting face of said decorative sheet.

13. A high pressure laminate as defined in claim 8 wherein the resins of said adhesive coating is cross-linkable.

14. A high pressure laminate as defined in claim 8 wherein said resin is an epoxy resin having an equivalent weight between approximately 400 and 6,000, and a softening point within the range of approximately 140°–175°F.

15. A high pressure laminate as defined in claim 8 wherein said thermosetting resin is polyvinylbutyral, having a molecular weight within the range of approximately 34,000 – 270,000; a softening point within the range of approximately 105° – 155°F, and a specific gravity within the range of approximately 1.00 – 1.25.

16. A high pressure laminate as defined in claim 8 wherein said thermosetting resin is phenolformaldehyde, having a softening point within the range of approximately 170°–220°F and a specific gravity within the range of approximately 1.15 –1.30.

17. A high pressure laminate as defined in claim 8 wherein said thermosetting resin is phenol-furfural, having a softening point within the range of approximately 140°–175°F and a specific gravity within the range of approximately 1.00 – 1.30.

18. A high pressure laminate as defined in claim 8 wherein said thermosetting resin is resorcinol formaldehyde, having a softening point within the range of approximately 140°–175°F and a specific gravity within the range of approximately 1.00 – 1.30.

* * * * *